(12) United States Patent
Faris

(10) Patent No.: US 7,029,601 B2
(45) Date of Patent: Apr. 18, 2006

(54) ALIGNED CHOLESTERIC LIQUID CRYSTAL INKS

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/419,700

(22) Filed: Apr. 21, 2003

(65) Prior Publication Data

US 2004/0011995 A1    Jan. 22, 2004

Related U.S. Application Data

(63) Continuation of application No. 09/906,396, filed on Jul. 16, 2001, now Pat. No. 6,551,526, which is a continuation of application No. 08/787,282, filed on Jan. 24, 1997, now Pat. No. 6,338,807, which is a continuation of application No. 08/265,949, filed on Jun. 27, 1994, now Pat. No. 5,599,412, which is a continuation of application No. 07/798,881, filed on Nov. 27, 1991, now Pat. No. 5,364,557.

(51) Int. Cl.
*C09K 19/52* (2006.01)
*C09K 19/36* (2006.01)
*B05D 7/00* (2006.01)
*B01J 13/22* (2006.01)
*B32B 19/02* (2006.01)

(52) U.S. Cl. .......................... 252/299.01; 252/299.5; 252/299.7; 427/212; 427/213.31; 427/511; 428/407

(58) Field of Classification Search ............. 252/299.7, 252/299.5, 299.01; 427/212, 511, 213.31; 428/1.3, 1.6, 407; 355/132
See application file for complete search history.

(56) References Cited

U.S. PATENT DOCUMENTS

| | | | | | |
|---|---|---|---|---|---|
| 5,364,557 | A | * | 11/1994 | Faris | 252/299.01 |
| 5,599,412 | A | * | 2/1997 | Faris | 156/73.3 |
| 6,338,807 | B1 | * | 1/2002 | Faris | 252/299.01 |
| 6,551,526 | B1 | * | 4/2003 | Faris | 252/299.01 |

* cited by examiner

*Primary Examiner*—Shean C. Wu

(57) ABSTRACT

In color printing, and in the fine arts, cholesteric liquid crystal (CLC) color inks are known to possess much higher color saturation and brightness than conventional pigment and dyed based inks. However, prior art CLC ink formulations are inconvenient because in the liquid phase they have to be confined in cells, and in the solid phase, they have to be applied at high temperature, and have to be aligned by some means to produce the optimum color. This invention solves the problem encountered in the CLC prior art, by making pre-aligned CLC platelets or flakes of appropriate thickness and size and mixing them in appropriate host fluids producing a novel CLC ink which can be applied at room temperature and without the need for alignment. The new pre-aligned room temperature CLC ink can be used as a substitute for conventional inks in almost all printing and plotting, and manual drawing and painting. Using the notch filter CLC platelets, the brightness is further enhanced. This invention teaches the CLC ink concepts, its applications and method of manufacturing.

10 Claims, 3 Drawing Sheets

LCP = Left Circularly Polarized
RCP = Right Circularly Polarized

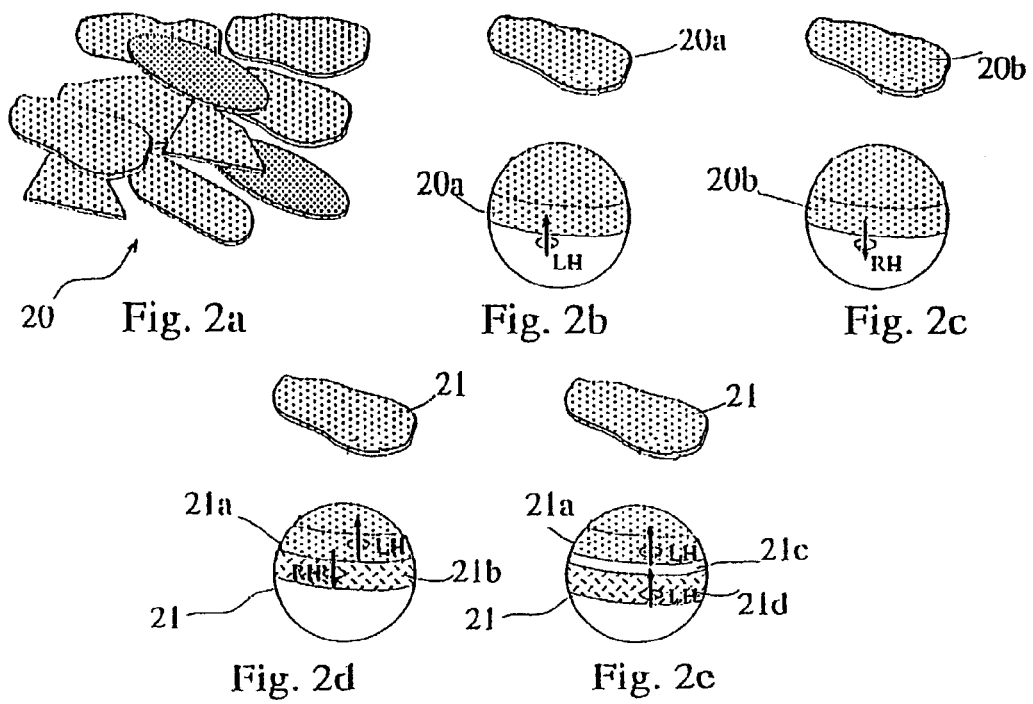
Fig. 2a  Fig. 2b  Fig. 2c
Fig. 2d  Fig. 2e
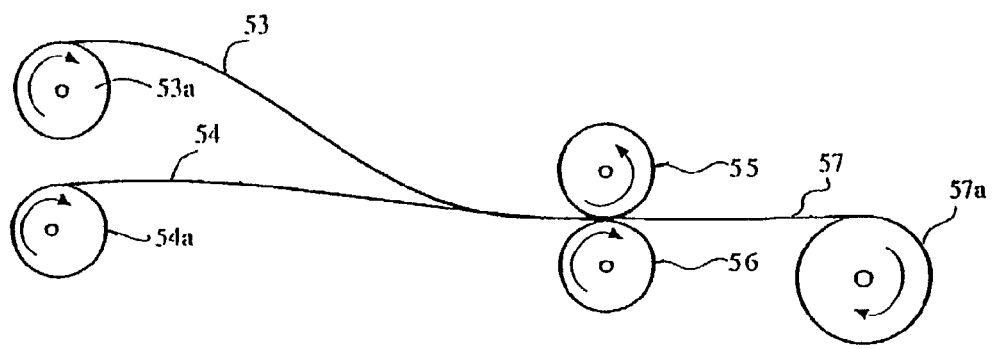
Figure 4a
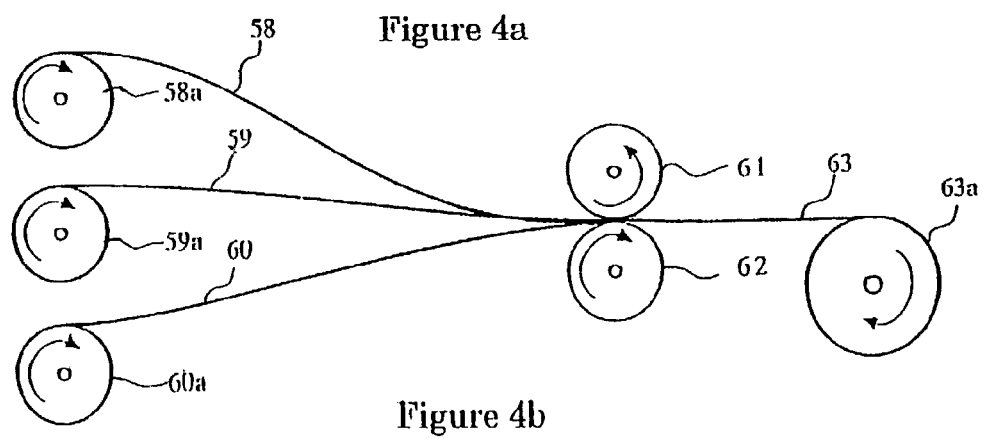
Figure 4b

ALIGNED CHOLESTERIC LIQUID CRYSTAL INKS

This application is a continuation of Ser. No. 09/906,396 filed Jul. 16, 2001 now U.S. Pat. No. 6,551,526, which is a continuation of Ser. No. 08/787,282 filed Jan. 24, 1997 now U.S. Pat. No. 6,338,807, which is a continuation of Ser. No. 08/265,949 filed Jun. 27, 1994, U.S. Pat. No. 5,599,412, which is a continuation Ser. No. 07/798,881 filed Nov. 27, 1991, U.S. Pat. No. 5,364,557.

BACKGROUND OF THE INVENTION

1. Field of the Invention

This invention relates to the field of color inks and paints used in the printing, signage, fine and decorative arts industries.

2. Description of Related Art

David Makow in Color, Vol. 11, No. 3, p. 205 (1986) has shown that cholesteric liquid crystals (CLC), and in particular, the CLC polymers (U.S. Pat. No. 4,410,570), possess color properties and effects that are not possible to obtain by conventional dyes and pigments, including: additive color properties; higher saturation and wider color gamut. However, in their present forms, liquid crystal coatings cannot be used as general purpose color inks and paints for the printing, signage, fine and decorative arts industries. CLC's in the liquid phase are not possible to use unless they are somehow encapsulated. The CLC polymer coatings, on the other hand, are solid at room temperature, and as Makow showed, produce remarkable color effects and are highly stable. These CLC polymers are still inconvenient for general purpose applications because they have to be applied at high temperatures. The polysiloxane-based CLC polymers are applied at 140° C. in the liquid crystal phase and its molecules must be aligned to form the helical configuration with the helix axis perpendicular to the substrate (paper or canvas). This constrains the use of CLC polymers only in special applications and only by specialists.

This invention shows that by making CLC polymers into flat flakes or platelets having the helical axis normal to the platelets surface and mixing them in a suitable fluid, the prior art problems are solved, making it possible for CLC polymers to be conveniently used for general purpose applications exploiting their remarkable color properties. This is a CLC ink which is applied at room temperature, and no further alignment by the user is needed, since the platelets are already in the proper helical configuration.

SUMMARY OF THE INVENTION

The principal object of the present invention is to provide a method for producing CLC flat flakes or platelets.

Another object of this invention is to make novel CLC color inks which can be applied at room temperature and after drying, retain their remarkable color effects.

Another object of this invention is to provide a method for making CLC color inks using notch filter platelets which result in 100% reflection of ambient light producing the brightest and most saturated colors.

Another object of this invention is to provide low cost polarizers and polarizing filters.

Another object of this invention is to to provide a broadband circular polarizer based on CLC materials.

Another object of this invention is to provide a new method for making micro-polarizer arrays needed for 3-D stereo displays.

Yet another object of this invention is to provide novel color CLC pens, pencils, and crayons for painting and printing applications.

These and other objects will become apparent when the preferred embodiments are described.

BRIEF DESCRIPTION OF THE DRAWINGS

FIG. 2 illustrates cross sections of individual platelets of the simple kind and the notch filter kind.

FIG. 4 illustrates methods of laminating CLC layers and retarder layer for producing notch filter CLC platelets.

DETAILED DESCRIPTION OF THE PREFERRED EMBODIMENTS

Cholesteric Liquid Crystal Inks

Figure 1A:
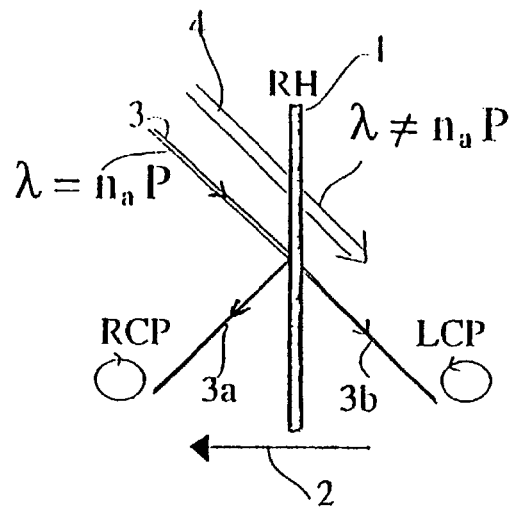
FIG. 1 is an illustration of cholesteric liquid crystal polymer platelets which are used in the novel ink.

The present invention depends on the well known properties of chiral liquid crystals, CLC, ( also called cholesteric liquid crystals) described in the following references: S. D. Jacobs et. al., Journal of the Optical Society of America, B, Vol. 5(9), pp 1962–1978 (September 1988); ii)—Martin Schadt and Jurg Funfschilling, Society of Information Displays, SID 90 DIGEST, p 324 (1990); and iii)—Robert Maurer, et. al., Society of Information Displays, SID 90 DIGEST, p 110 (1990). These liquid crystals spontaneously order themselves in an optically active structure of a left handed (LH) helix or a right handed (RH) helix with a helix pitch P, and an optical axis which coincides with the helix axis. FIG. 1a shows an RH, CLC film 1 (cross section) prepared with its optical axis 2 perpendicular to the film. It exhibits the property of selective reflection when a monochromatic beam 3 of wavelength $\lambda$, propagating along the helix axis satisfies the relationship $$\lambda = \lambda_0 = n_a P, \quad (1)$$

where $n_a$ is the average refractive index of the CLC material and P is its pitch. Unpolarized light 3 with wavelength $\lambda = \lambda_0$ incident on the film will interact with the helix structure and causes the reflection of 50% of its intensity as right circularly polarized light 3a (RCP), and the other 50% is transmitted as left circularly polarized light 3b (LCP). On the other hand, if the incident light 4 has one or more wavelengths that are not equal to $\lambda_0$, all the light is transmitted. We remark that equation (1) is strictly valid in the case where the angle of incidence $\theta$ (measured from the helix axis) is zero. For a non-zero value of $\theta$, the effective value of $\lambda_o$ shifts to a shorter wavelength $\lambda_\theta$ given by $$\lambda_\theta = \lambda_o [\cos \{\sin-1(\sin \theta/n_a)\}] \quad (1a)$$

Figure 1B:
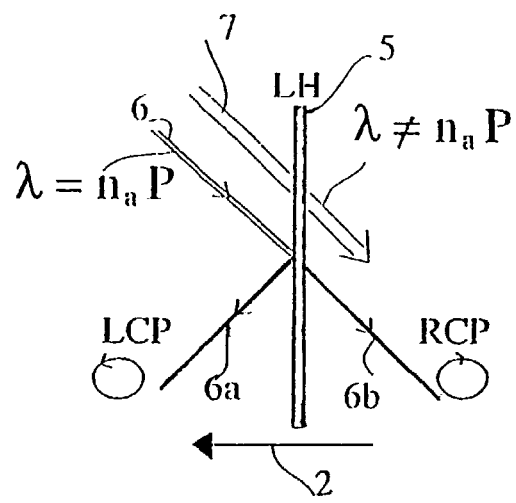

In all subsequent discussions in this application, whenever $\theta \neq 0$ it is implied that $\lambda_o$ means $\lambda_\theta$ as given by Eq. (1a). If the film had an LH helix, FIG. 1b, and the incident unpolarized light 6 satisfies $\lambda = \lambda_o$, 50% of the selectively reflected polarized light 6a would have the LCP state, and the other 50% transmitted part 6b would have the RCP state. The selective reflection wavelengths according to Eq. 1 is tuned by tuning the pitch length which is a material property that is varied by varying the chiral concentration or the concentration of the mesogenic side-groups (U.S. Pat. No. 4,410,570). Thus the CLC materials are prepared to produce the three additive primary colors; red, green, and blue. It is important to note that this selective reflection polarizing property does not involve or depend on an absorptive mechanism as in the case of conventional color pigments, dyes and sheet polarizers.

Figure 1C:
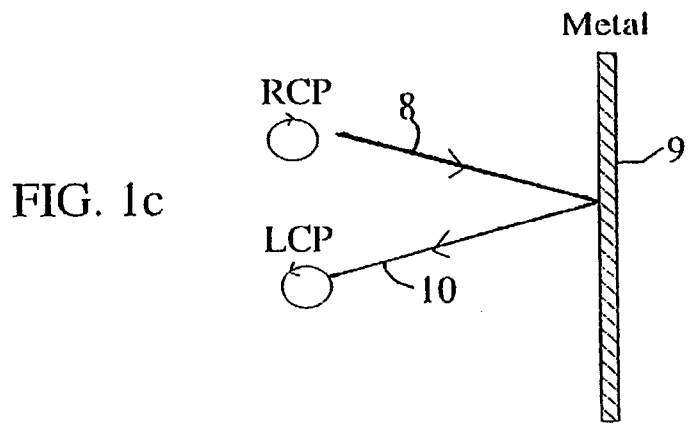
Figure 1D:
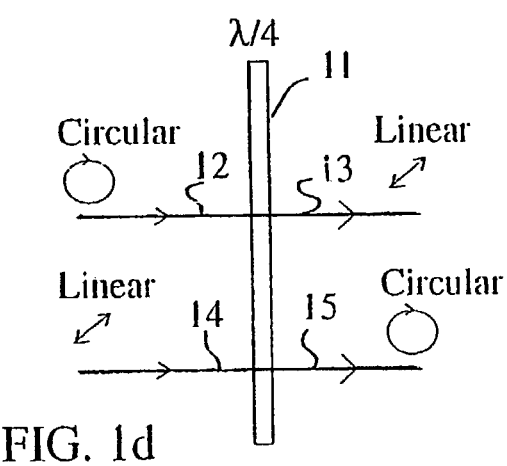
Figure 1E:
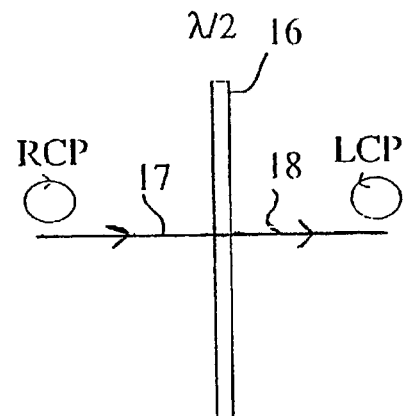

A fundamental property of light is that it can have only two independent, mutually orthogonal polarization states, either circular, LCP and RCP states, or linear states. Other polarization properties of light used in this invention are shown in FIGS. 1c–1e. FIG. 1c shows that an LCP light 8 incident on a metallic reflector 9 is converted into an RCP light 10 because the metal causes a phase shift of 180° between the independent electric field vector components. A quarter-wave retarder 11, FIG. 1d, causes a 90° phase shift and converts a circular light 12 into linear 13, and a linear light 14 into circular 15. In FIG. 4e, a half-wave retarder 16 converts RCP light 17 into LCP light 18 and vice versa by causing a phase shift between the independent electric field vector components.

The present invention relies on CLC materials in the solid state at the operating temperature. Such CLC polymers have been synthesized in the LH and RH formulations (See M. L. Tsai et al , Appl. Phys. Lett., 54 , 2395 (1989)). These polymers are brittle. I have exploited this brittleness property in an experiment to prove that I can make small flakes or platelets which when applied (easily transferred) to a different substrate, retained their selective reflection property, i.e, the platelets remained aligned in the helical conliguration with the helix axis normal to the platelet surface. FIG. 2a illustrates typical CLC flakes or platelets shapes 20. They can have regular or irregular geometrical shapes, with the avenge lateral dimension typically more than 3 times the thickness. Platelets 20 could have average lateral dimensions are in the 4 to 100 microns range (8 to 200 helix pitches), and average thicknesses of 4 to 20 helix pitches. FIGS. 2b and 2c show simple CLC platelets 20a, 20b which have either LH CLC (20a) or RH CLC (20b) helices. These simple platelets while they yield acceptable brightness and color saturation for many printing applications, they still waste 50% of the selected color energy. The notch filter platelets shown in FIGS. 2d and 2e are preferred because they reflect 100% of the light, thereby increasing the brightness by a factor of 2. This can be understood by referring to the CLC and polarization of light properties described above and in FIG. 1. In FIG. 2d, a platelet 21 for a particular color band (e.g. red) consists of two CLC layers, an LH layer 21a and an RH layer 21b. A red beam incident on platelet 21 is totally reflected. 50% of the light is reflected by the LH layer 21a as an LCP light, and the remaining 50% is transmitted through the LH layer 21a as an RCP beam. Said transmitted RCP beam is subsequently reflected by the RH layer 21b and is then transmited again through layer 21a to the observer. Thus, all the incident light is reflected. The same result is achieved if the RH layer 21b is replaced with a half-wave retarder layer 21e and a second LH layer 21d as shown in FIG. 2e. In this case, the RCP light transmitted through layer 21a is converted to LCP light by the retarder 2c which in turn is reflected by the second LH layer 21d. The reflected LCP is transmitted again (in the reverse direction) through retarder 21d and is converted back to RCP light that is transmitted again (in the reverse direction) through the first LH layer 21a, completing the 100% reflection of the incident red beam. The same happens for the other colors by means of appropriately tuned platelets. These platelets of the simple 20 and notch filter 21 types are mixed in a suitable fluid producing a CLC ink which is ten used in printing, drawing, painting and other imaging applications. These CLC inks are applied at room temperature and do not need alignment by the user, solving prior art problems encountered in the Makow Reference. Conventional pigments and dye inks filter colors by an absorption mechanism and are applied to white background, such as paper substrates. The CLC inks, on the other hand, are reflective (see properties described above, FIG. 1) and are applied to black background such as black paper. The CLC inks are applied to the black substrate such that the platelets lie parallel to the substrate surface, and the CLC helical axes are normal to said substrate surface. Exploiting the remarkable additive and color saturation properties, red, green and blue CLC inks are sufficient to generate all colors. These CLC color inks are mixed before application to the substrate or they are mixed sequentially as they are applied in turn onto the substrate. To my knowledge, no prior art has taught how to produce CLC inks, applied at room temperature (or operating temperature), that reflect 100% of the incident color, and without the need for alignment.

The CLC ink according to this invention comprises the pre-aligned CLC flakes or platelets and a suitable fluid. Said fluid is well known in the ink art ( see Chapter 18, p 523 in J. Michael Adams, *Printing Technology*, 3rd Ed., Delmar Publishers, Inc., Albany, N.Y., 1988) and is selected depending on the applications. It further comprises vehicles and additives chosen for tackiness, drying speed, adhesion to substrates, printing or painting methods, and other properties.

Manufacturing Method

Figure 3A:
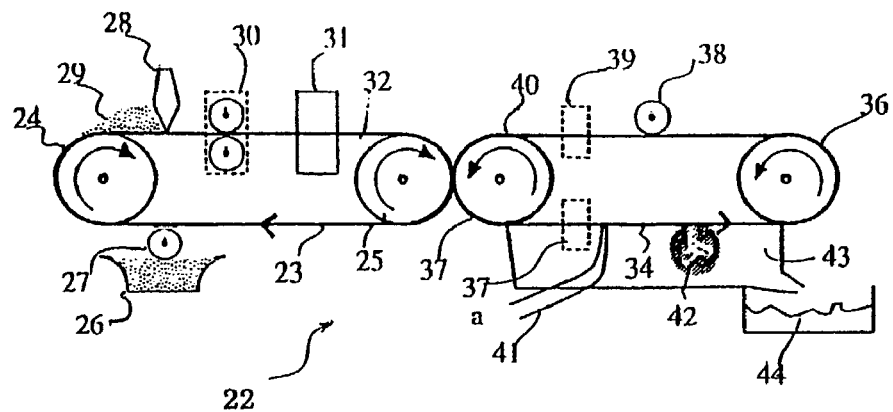
FIGS. 3a-c illustrate three methods for manufacturing CLC platelets and inks.
Figure 3B:
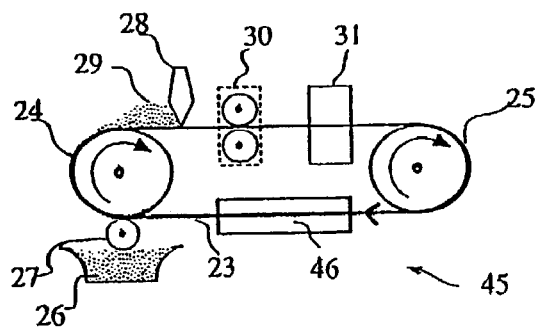
Figure 3C:
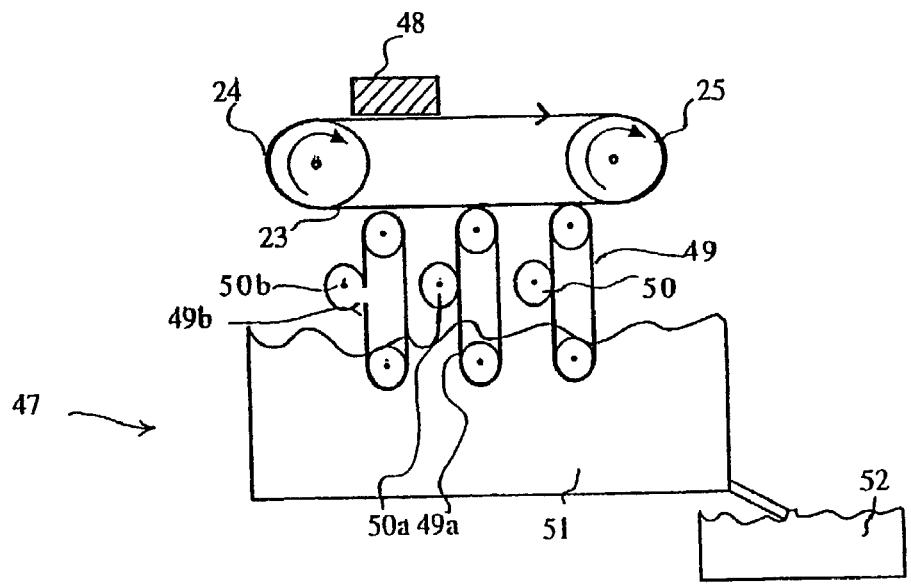

FIGS. 3a–c describe methods and apparatuses used for high throughput economical manufacturing of CLC platelets. Apparatus 22 in FIG. 3a comprises a first belt 32 rotated continuously by means of rotating drums 24, 25, and a second belt 34 rotated by drums 36, 37 in the opposite direction of first belt 32. The first belt 32 carries the aligned coating of a CLC, while the second belt 34 is allowed to press against the first belt in order to remove the CLC coating by adhesive means. This process of coating and removal of aligned CLC layers and the production of the final product, the platelets or flakes are carried out continuously according to the following steps:

1. The starting CLC polymer material in a molten state in a container 26 is coated onto belt 23 by means of a roller 27 (other coating means such as spraying and casting are possible).

2. While the coated belt is in motion, a knife edge means 28 is used to smooth the CLC film, maintains a uniform and repeatable thickness, and aligns the CLC molecules such that the helix axis is perpendicular to the belt surface. The alignment step is a crucial element for practicing this invention. The excess CLC material 29 is recycled.

3. The pre-aligned CLC film then passes through an auxiliary alignment means 30 (if necessary) which applies electric or magnetic fields in the proper orientation to ensure that the entire film is aligned in the helical form.

4. Above steps are carried out above the glass temperature and below the clearing temperature of the CLC polymer. For polysiloxane-based CLC polymers, this coating and aligning temperature (processing temperature)is between 120° C. and 150° C. Other CLC polymers may require different processing temperatures.

5. The aligned CLC film then passes through a drying and cooling chamber 31 and the desired pre-aligned CLC film 32 below the glass temperature is brittle and can be transferred adhesively by the second belt 34.

6. The second belt 34, rotating in the opposite direction of first belt, is coated by means of a roller 38 (spraying or other well-known means may be used) with an adhesive. Said adhesive passes through chamber 39 for drying and maintaining an optimum operating temperature, and other adhesive properties. The adhesive could be water soluble polyvinyl alcohol or other adhesives which can be dissolved in suitable low cost solvents that have minimum environmental impact. Some adhesive may be chosen to be brittle when dry.

7. The optimized adhesive coating 40 is pressed by means of drum 37 onto CLC film 32 on drum 25. This action transfers the CLC film from belt 23 to belt 34. Drums 25 and 37 have a rubber surface that ensures optimum transfer of CLC to the adhesive. My experiments indicated that the polysiloxane CLC polymer transfers in the form of small platelets or flakes.

8. The transferred CLC on the adhesive is passed through a cooler 37a which cools the combined coating to low enough temperature to ensure the brittleness of both CLC coating and the adhesive coating. While polysiloxane based CLC polymer is naturally brittle at room temperature, other CLC polymers may not be brittle enough for the subsequent step. By cooling to cryogenic temperature such as that of liquid carbon dioxide or liquid nitrogen, it is well known that polymers (CLC's and adhesives) become brittle.

9. The brittle CLC and adhesive are removed by means of an ultrasonic air jet 41 or an air jet mixed with fine powder abrasive. The CLC on adhesive that is not removed by the ultrasonic means is scrubbed off by means of a scrubber 42. The flakes of CLC on adhesive are collected in a container 43 and are poured into container 44.

10. The CLC on adhesive mixture is further broken into the desired average flake or platelet size. The adhesive is subsequently dissolved off and separated from the CLC flakes which are dried and mixed with the appropriate fluid to produce CLC ink.

11. The process steps 1–10 for producing aligned CLC flakes are repeated continuously as belts 23 and 34 continue to counter rotate.

FIG. 3b shows another embodiment 45 for producing aligned CLC flakes that uses only a single belt. The embrittled aligned CLC film passes through an ultrasonic bath 46 which imparts intense ultrasonic energy to the CLC film causing it to flake-off.

Yet another embodiment 47 for producing aligned CLC platelets and simultaneously produce the final CLC ink (with minimum steps) is shown in FIG. 3c, comprising: a belt 23; two drums 24, 25; a means 48 for coating, and aligning CLC films; and a means for transferring said films. The transfer means further comprises one or more transfer belts 49, 49a, 49b, coated respectively with adhesives by means of rollers 50, 50a, 50b. The rollers 50, 50a, 50b coat each of their respective belts with a random adhesive pattern. These patterns are designed to transfer CLC flakes with a predetermined average size. The belts 49, 49a, 49b are immersed in solvent container 51 which dissolves off the adhesive and precipitates the flakes with a predetermined average size that are ready for use in inks. In this case the solvent may be the appropriate fluid needed for the final CLC ink product.

The coating and alignment means 27, 28, 30, 31, 48 used above for the simple aligned CLC flake 20 in FIGS. 2b, 2c can also be used to produce the notch filter flakes 21 in FIGS. 2d, 2e by placing in the proper sequence a plurality said coating, aligning, and drying means. Alternatively, FIG. 4a shows an embodiment which laminates pre-aligned LH CLC film 53 on a substrate (dispensed from a roll 53a) with a pre-aligned RH CLC film (dispensed from a roll 54a) using the counter rotating laminating rollers 55, 56 and the final notch filter laminate 57 is taken up by roller 57a. The LH and RH laminate 57 is then broken into proper sized flakes for use in CLC ink product. In FIG. 4b, another notch filter laminate 63 is produced from laminating pre-aligned LH CLC films 58, 60 with a half-wave retarder film 59, said retarder film being interposed between said CLC films.

Many skilled in the art will be able to find other variations of producing aligned CLC inks without departing significantly from the basic teachings of this invention. For instance, if the pre-aligned CLC film is not brittle, it is still possible to use it for producing platelets by well known patterning and etching means. In this case photo-resist or etch resist patterns are generated which serve to protect the desired platelets regions, and the exposed regions are etched away by a suitable wet or dry etching means. This would produce the desired platelet size and shape.

Applications of CLC Inks

The aligned CLC inks produced based on the teachings of this invention can be used in the printing, signage, fine and decorative arts industries. Unlike prior art, these inks can be dispensed by well known means at room temperature and without the need for further alignment of the CLC molecules into the desired helical form. In the CLC ink, the aligned CLC flakes are suspended in a host fluid or a host matrix depend on the printing or imaging application. In a crayon or a pencil form, the host matrix could be a wax or an equivalent sticky material that is solid state at room temperature. This is used by the painter by rubbing off onto a black paper, the CLC flakes of the appropriate color and the host matrix. The host fluid could be dispensed from a pen for drawing, paining, plotting, and writing. The ink could be applied by means of a brush, roller, or spray gun. The ink could also be formulated for use in off-set printing wherein the host fluid is made hydrophobic, or in gravure and flexographic printing wherein the host fluid is formulated for printing on plastic substrates, or other substrates. The CLC ink may also be used as a toner in electrographic copier and printers (based on xerography process), thermal color printers as well as inkjet printers. According to this invention, color images are produced which feature colors more saturated and brightness high than can be produced by conventional pigment and dye based inks. The new method for producing reflective color images generally comprises: aligned CLC color inks having at least the three additive primary colors red, green and blue; an ink dispensing tool which applies the CLC ink at ambient temperature; an image source which drives the ink dispensing tool; and a black substrate (paper, canvas, plastic sheet). Color images of the transmission kind can be produced by applying the CLC color inks to a transparent substrate such as glass, polycarbonate sheets, acrylic sheets, and other plastics. In both the reflective and transmissive images, the notch filter CLC 21 produce the brightest and highest saturation images.

Aligned CLC inks can be used in other applications such as the production of:

1. Polarizing color filters and filter arrays for displays and other imaging applications, by simply printing the appropriate pattern with CLC inks.
2. Broad band polarizers and micropolarizer arrays can also be printed for use in 3-D stereo imaging, 3-D displays, 3-D printing, and 3-D cameras.
3. Variable transmission windows.

What is claimed is:

1. A method for producing hard copy color images at ambient temperatures comprising:
   providing one or more pre-aligned color CLC inks, each ink comprising:
      pre-aligned CLC platelets; and host material for suspending said platelets; and
   releasing said pre-aligned CLC ink onto a substrate on which an image is formed which is designed to ensure the adhesion of the pre-aligned CLC ink onto said substrate such that the platelet surfaces are aligned parallel to the substrate surface.

2. A method for producing hard copy color images according to claim 1, wherein releasing said pre-aligned CLC ink is performed by manual painting or drawing.

3. A method for producing hard copy color images according to claim 1, wherein releasing said pre-aligned CLC ink is performed by the color printing press.

4. A method for producing hard copy color images according to claim 1, wherein releasing said pre-aligned CLC ink is performed by a printer driver by a computer.

5. A method for producing hard copy color images according to claim 1, wherein releasing said pre-aligned CLC ink is preformed by etching.

6. A method for producing hard copy color images according to claim 1 releasing said pre-aligned CLC ink is performed by a screen printer.

7. A method for producing hard copy color images according to claim 1, wherein releasing said pre-aligned CLC ink is performed with pens, pencils or crayons.

8. A method for producing hard copy color images according to claim 1, wherein releasing said pre-aligned CLC ink is performed with or spray guns.

9. A method for producing hard copy color images according to claim 1, wherein, the substrates are black, white, transparent, or colored sheets.

10. A method for producing hard copy color images according to claim 1, wherein, the substrates are selected from the group of substrate materials consisting of plastic, paper, wood, metal, and any combination comprising at least one of the foregoing substrate materials.

* * * * *